(12) United States Patent
Swartzlander, Jr.

(10) Patent No.: US 8,099,447 B2
(45) Date of Patent: Jan. 17, 2012

(54) NEGATIVE TWO'S COMPLEMENT PROCESSOR FOR WINDOWING IN HARMONIC ANALYSIS

(76) Inventor: Earl Eugene Swartzlander, Jr., Austin, TX (US)

(*) Notice: Subject to any disclaimer, the term of this patent is extended or adjusted under 35 U.S.C. 154(b) by 0 days.

(21) Appl. No.: 12/925,352

(22) Filed: Oct. 20, 2010

(65) Prior Publication Data

US 2011/0040816 A1    Feb. 17, 2011

Related U.S. Application Data

(63) Continuation-in-part of application No. 11/370,783, filed on Mar. 8, 2006, now abandoned.

(51) Int. Cl.
*G06F 15/00* (2006.01)
*G06F 7/52* (2006.01)
(52) U.S. Cl. ...................................................... 708/204
(58) Field of Classification Search .................. 708/204, 708/625
See application file for complete search history.

(56) References Cited

U.S. PATENT DOCUMENTS 4,584,661 A * 4/1986 Grundland .................... 708/712
5,267,187 A * 11/1993 Hsieh et al. .................. 708/700

OTHER PUBLICATIONS

Park et al., "Truncated Multiplications for the Negative Two's Complement Number System", IEEE, pp. 428-432, 2006.*
Harris, "On the Use of Windows for Harmonic Analysis with the Discrete Fourier Transform", Proc. IEEE, pp. 172-204.*

* cited by examiner

*Primary Examiner* — Chuong D Ngo
(74) *Attorney, Agent, or Firm* — McCain & Klawinski, P.C.; Brian P. Klawinski (57) ABSTRACT

The present invention provides a solution to the shortcomings of the traditional two's complement system that is commonly utilized in modern computing systems and digital signal processors for calculating harmonic analysis using a discrete time-frequency transform. In the negative two's complement processor a n-bit number, A, has a sign bit, $a_{n-1}$, and n−1 fractional bits, $a_{n-2}, a_{n-3}, \ldots, a_0$. The value of an n-bit fractional negative two's complement number is:

$$A = a_{n-1} + \sum_{i=0}^{n-2} -a_i 2^{i-n+1}.$$

2 Claims, 8 Drawing Sheets

PRIOR ART

Fig. 8

NEGATIVE TWO'S COMPLEMENT PROCESSOR FOR WINDOWING IN HARMONIC ANALYSIS

This application is a continuation-in-part of application Ser. No. 11/370,783, filed on Mar. 8, 2006, now abandoned.

BACKGROUND OF THE INVENTION

In harmonic analysis using a discrete time-frequency transform such as the discrete Fourier transform, the discrete cosine transform, etc. windowing is used to avoid the discontinuity that occurs when the finite sequence is made periodic. The windowing involves multiplying each point of the finite data sequence by a numerical value in the range from 0 to 1.00. This computation is not possible in implementations that use the conventional two's complement fractional number system since it cannot represent the value +1.00. As explained in the following paragraph, implementations that use the two's complement fractional number system can only represent values from −1.00 to just less than +1. A potential solution is to negate the data sequence so that it ranges from −1.00 to just less than +1 and the window values range from just less than 0 to −1.00. This approach has the problem that in the two's complement fractional number system, multiplying −1.00 times −1.00 produces a result (+1) that cannot be expressed. Many existing implementations flag this result as an "error" while others return the value −1.00 which is a significant error.

An important aspect of implementations that use the current two's complement fractional number system is that the most negative number that can be represented is −1.00 while the most positive number that can be represented is one unit in the least significant position (ULP) less than +1. This results in a problem wherein not all multiplication products can be represented. For example, −1.00×−1.00 produces a result (+1) that cannot be represented as a two's complement fractional number. Therefore a need exists for a new system wherein all multiplication products produce a result that can be represented.

BRIEF SUMMARY OF THE INVENTION

The present invention is an improved method for arithmetic functionality in digital signal processors, more particularly; the present invention is an implementation of a new numbering system for use in digital signal processors that provides better results for harmonic analysis, yet still more particularly; the claimed invention implements a new number representation for use in computers and digital signal processors wherein the product of all possible multiplications can be correctly represented in the numbering system.

DETAILED DESCRIPTION OF THE INVENTION

Figure 1:
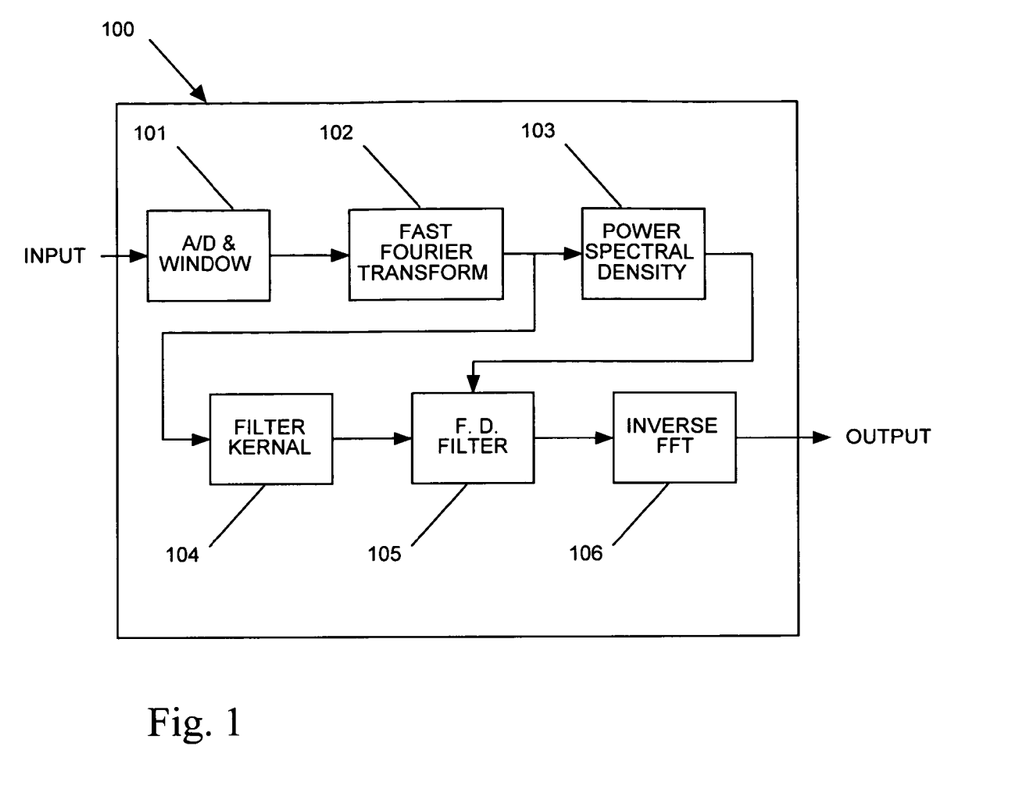
FIG. 1 illustrates a digital signal processor wherein the current invention is implemented.

FIG. 1 illustrates an example of a digital signal processing system 100 that can benefit from the present invention. This specific digital signal processing system is a frequency domain adaptive digital filter. The system 100 includes an Analog to Digital converter (A/D) and window unit 101, a fast Fourier transform processor 102, a power spectral density unit 103, a filter kernel computer 104, a frequency domain filter 105, and an inverse fast Fourier transform processor 106. The frequency domain adaptive digital filter 100 may be implemented utilizing any commercially available digital signal processor that has been suitably programmed and which has been modified as described below or it may be implemented using an application-specific processor. The frequency domain adaptive digital filter 100 is capable of receiving a variety of analog inputs from a variety of different types of input devices. Radar receivers and sonar sensors are examples of two such types of input devices.

Figure 2:
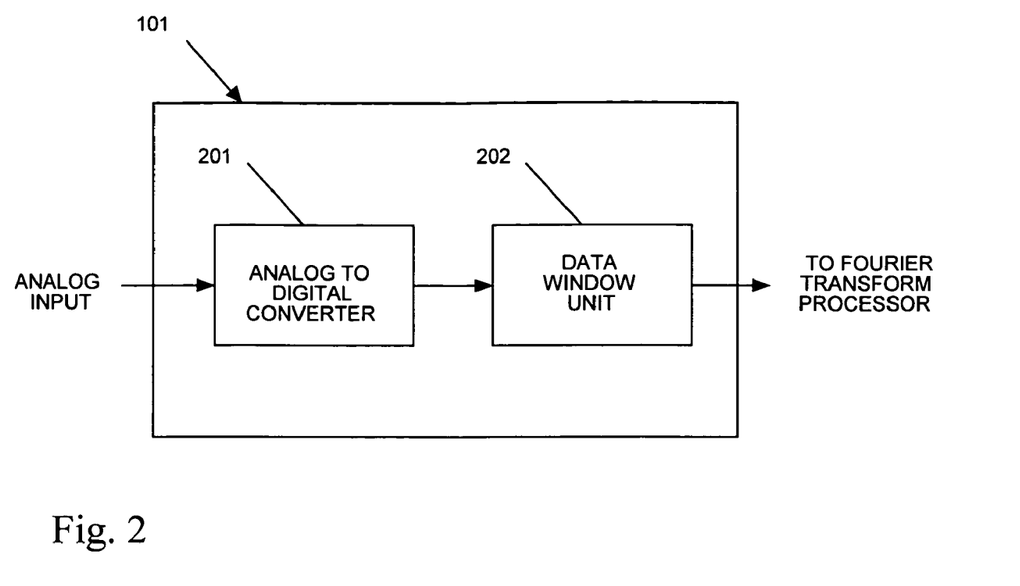
FIG. 2 depicts a more detailed view of a portion of the digital signal processor wherein the claimed invention is utilized.

FIG. 2 depicts a more detailed view of the analog to digital converter and data window unit 101 of FIG. 1 in accordance with the present invention. The analog input enters the analog to digital converter 201, which produces a stream of digital data values. The digital data enter the data window unit 202, which produces a stream of windowed data values that are output to the Fourier transform processor 102 as shown on FIG. 1.

The analog to digital converter 201 may operate in a streaming mode where the digital output is a continuous stream of digital values at a selected rate (for example 44,000 samples per second) or it may internally buffer the stream of digital values into a block (for example 1,024 samples) that is held within the analog to digital converter 201 until a command is received to transfer the data block to the data window unit 202. It should also be appreciated that the present invention can be implemented with either the continuous stream mode or with the block mode.

Figure 3:
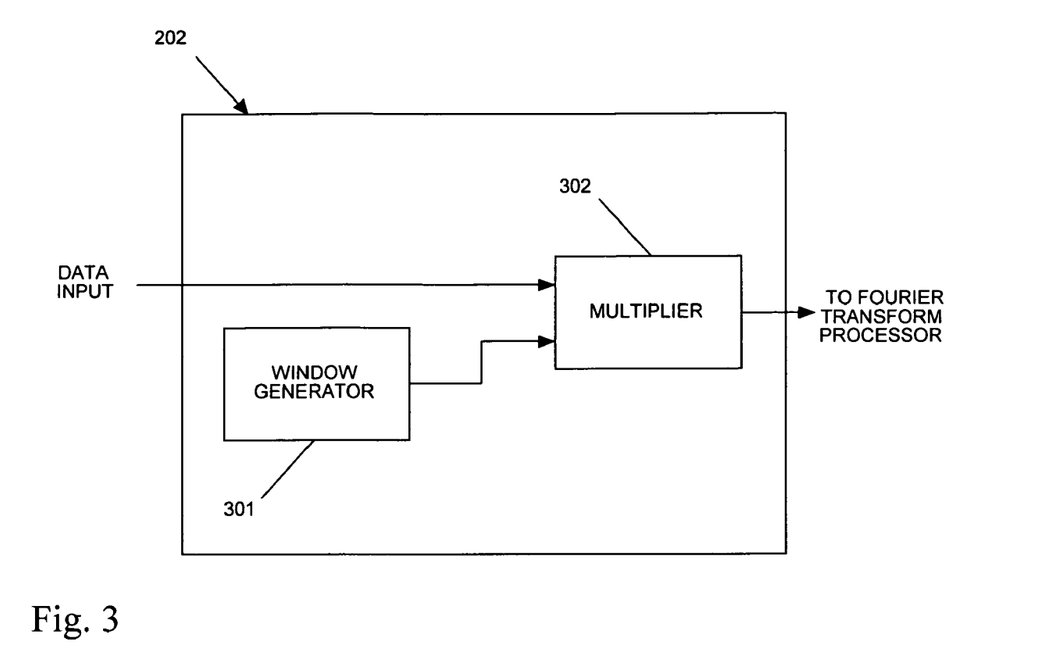
FIG. 3 shows a data windowing unit wherein the claimed invention is utilized.

FIG. 3 depicts a more detailed view of the data window unit 202 of FIG. 2 in accordance with the present invention. In this embodiment, a window generator 301 creates a window that is input along with the digital data from the analog to digital converter 201 shown on FIG. 2 to a multiplier 302. The multiplier forms the product of the digital data times the value of the window using the negative two's complement numbering system. Those skilled in the art will readily appreciate that the present invention is useful performing other computations (for example the frequency domain filter 105 shown in FIG. 1) in a digital signal processor or more generally in a digital computer.

The window generator 301 may operate in a streaming mode where the digital output is a continuous stream of digital values (either real or complex) at a selected rate (for example 44,000 samples per second) or it may internally buffer the stream of digital values that comprise the data window into a block (for example 1,024 samples) that is held within the window generator 301 until a command is received to transfer the data block to the multiplier 302. The window generator 301 may be realized with a memory (either a fixed read only memory or a random access memory). Alternatively, the window generator 301 may be realized with logic that computes the values of the window as they are needed. The present invention can be implemented with either the continuous stream mode or with the block mode.

Figure 4:
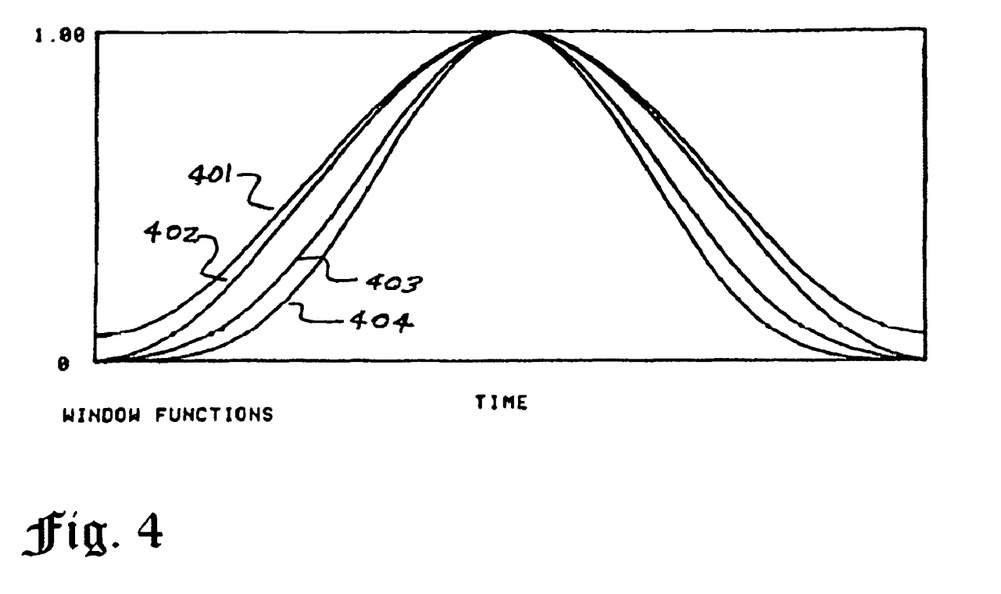
FIG. 4 illustrates four example data windows that can be used with the claimed invention.

FIG. 4, shows examples of four data windows. The four example data windows that are shown on FIG. 4 are the Hamming window 401, the Hanning window 402, the Blackman window 403 and a 30 dB per octave window 404. The figure shows the amplitude of the windows along the vertical axis and the time from the start to the end of the window along the horizontal axis. The windows are real valued with an amplitude range from 0 to +1.00. Note that all four of these example windows take on values that reach +1.00 in the center of the window. The time is adjusted to match the size of the data block that is being transformed so that the length of the window is the same as the length of the data block. These are only a few of the many windows that are known to those skilled in the art.

For convenience, assume that the digital signal processor is operating on blocks of data. The data input to the windowing unit of FIG. 3 is an N-word block of data denoted by x(t) where t takes on integer values that range from 0 to N−1. For this example, an N-point Hanning window is assumed. It takes on the values denoted by w(t) where t takes on integer values that range from 0 to N−1. The Hanning window 402 on FIG. 4 is defined by:

$$w(t) = \sin^2(t\pi/N), t=0, 1, 2, \ldots, N-1$$

Clearly, the extreme values for the Hanning window are 0 and +1.00. When t=0, w(t)=0 and when t=N/2, w(t)=1.00. The extreme values for the Blackman window 403 and a 30 dB per octave window 404 are also 0 to +1.00. The extreme values for the Hanning window 402 are 0.08 and +1.00.

Conventional digital signal processors are implemented using the conventional two's complement fractional number system. An n-bit two's complement fractional number, A, has a sign bit, $a_{n-1}$, and n−1 fractional bits, $a_{n-2}, a_{n-3}, \ldots, a_0$. The value of an n-bit two's complement fractional number is:

$$A = -a_{n-1} + \sum_{i=0}^{n-2} a_i 2^{i-n+1}$$

The most negative number that can be represented is A=−1.00 which occurs when the n-bit pattern of a is 1, 0, 0, 0, ... 0. The most positive number that can be represented is $A = 1-2^{-n+1}$ which occurs when the n-bit pattern of a is 0, 1, 1, 1, ... 1. Thus the conventional two's complement fractional number system cannot represent +1.00. As a result, the conventional two's complement fractional number system cannot represent a window function that includes the value +1.00.

A potential solution to this problem is to invert the window so that it ranges between 0 and −1.00 and back to 0. This poses the problem that for some data patterns, the data value may be −1.00 and the value of the window may be −1.00. Multiplying −1.00 by −1.00 should produce a result of +1.00, but that result cannot be represented with the conventional two's complement fractional number system. Most conventional two's complement fractional multipliers produce a clearly incorrect result of −1.00 for −1.00 times −1.00.

The present invention solves the problem by changing the way that numbers are represented by the digital signal processor. Specifically the number representation is inverted. The resulting numbers are referred to be the name "negative two's complement fractional number system." The details of the negative two's complement number system as implemented in the windowing unit are described in detail below. Since the system is implemented using standard logic gates (AND, OR, NAND and NOR), it can be added easily to existing processors. It has not been implemented in any systems to date.

An n-bit negative two's complement fractional number, A, has a sign bit, $a_{n-1}$, with a weight of +1 and n−1 fractional bits, $a_{n-2}, a_{n-2}, a_{n-3}, \ldots, a_0$ with negative fractional weights. The value of an n-bit negative two's complement fractional number is:

$$A = a_{n-1} + \sum_{i=0}^{n-2} -a_i 2^{i-n+1}$$

This is identical to the formula for conventional two's complement fractional numbers except that the signs of all bits (negative for the sign bit and positive for all other bits for conventional numbers) are reversed.

Table 1 shows the values of 4-bit negative two's complement fractional numbers and conventional 4-bit two's complement fractional numbers.

TABLE 1

4-bit Negative Two's Complement Fractional Numbers and Conventional Two's Complement Fractional Numbers

| Value | Negative Two's Complement Number | Two's Complement Number |
|---|---|---|
| 1 | 1 0 0 0 | N/A |
| 7/8 | 1 0 0 1 | 0 1 1 1 |
| 3/4 | 1 0 1 0 | 0 1 1 0 |
| 5/8 | 1 0 1 1 | 0 1 0 1 |
| 1/2 | 1 1 0 0 | 0 1 0 0 |
| 3/8 | 1 1 0 1 | 0 0 1 1 |
| 1/4 | 1 1 1 0 | 0 0 1 0 |
| 1/8 | 1 1 1 1 | 0 0 0 1 |
| 0 | 0 0 0 0 | 0 0 0 0 |
| −1/8 | 0 0 0 1 | 1 1 1 1 |
| −1/4 | 0 0 1 0 | 1 1 1 0 |
| −3/8 | 0 0 1 1 | 1 1 0 1 |
| −1/2 | 0 1 0 0 | 1 1 0 0 |
| −5/8 | 0 1 0 1 | 1 0 1 1 |
| −3/4 | 0 1 1 0 | 1 0 1 0 |
| −7/8 | 0 1 1 1 | 1 0 0 1 |
| −1 | N/A | 1 0 0 0 |

Given the definition of the two systems, the critical operation for windowing (that is, multiplication) is similar. Before describing multiplication, the arithmetic operations of addition, subtraction and complementation are described for negative two's complement fractional and conventional two's complement numbers. Examples for four bit negative two's complement fractional numbers are presented to illustrate the process.

The standard arithmetic operations are performed as is described below. Those skilled in the art will readily appreciate the similarity of the standard arithmetic operations under the traditional two's complement system with the present invention.

Addition in a processor that implements negative two's complement fractional numbers is identical to addition in a processor that implements conventional two's complement arithmetic. For example, for operands A $(=a_{n-1} \cdot a_{n-2}, \ldots, a_0)$ and B $(=b_{n-1} \cdot b_{n-2}, \ldots, b_0)$ with a carry input $c_0$, the sum S $(=s_{n-1} \cdot s_{n-2}, \ldots, s_0)$ is given by:

$c_{i+1} = a_i b_i + a_i c_i + b_i c_i$ for $i=0, 1, \ldots, n-1$ and
$s_i = a_i \oplus b_i \oplus c_i$ for $i=0, 1, \ldots n-1$ where $\oplus$ denotes exclusive OR, + denotes OR and • denotes AND.

As in a processor that implements the conventional two's complement number system, subtraction in a processor that implements the negative two's complement fractional number system is performed by adding the complement of the number. As for the conventional two's complement fractional system, the complement is formed by inverting all bits of the number and adding a 1 at the least significant bit position.

$$\frac{1}{2} + \frac{3}{8} \frac{\begin{array}{c}1.100\\1.101\end{array}}{1.001} = \frac{7}{8} \qquad -\frac{1}{4} + \frac{3}{8} \frac{\begin{array}{c}0.010\\1.101\end{array}}{1.111} = \frac{1}{8}$$

$$\frac{1}{2} - \frac{7}{8} \frac{\begin{array}{c}1.100\\0.111\end{array}}{0.011} = -\frac{3}{8} \qquad -\frac{1}{4} - \frac{1}{2} \frac{\begin{array}{c}0.010\\0.100\end{array}}{0.110} = -\frac{3}{4}$$

As for the conventional two's complement fractional number system, overflow may be detected by comparing the carry into the sign bit and the carry out from the sign bit. If the carries differ, overflow has occurred. In the first case (below left) $C_{in}=0$ and $C_{out}=1$, in the second case $C_{in}=1$ and $C_{out}=0$.

$$\frac{1}{2} + \frac{7}{8} \frac{\begin{array}{c}1.100\\1.001\end{array}}{0.101} = 1\frac{3}{8} \qquad -\frac{1}{2} - \frac{3}{4} \frac{\begin{array}{c}0.100\\0.110\end{array}}{1.010} = -1\frac{1}{4}$$

Overflow can occur only when adding numbers of like signs. It also may be detected by checking if the sign of the sum differs from the signs of the operands.

Overflow can be accommodated by allowing the word size of the result to increase by 1 bit. In this case there are two integer bits (a sign bit with a weight of 2 and a unit bit with a weight of −1), and n−1 negatively weighted fractional bits.

$$\frac{1}{2} + \frac{7}{8} \frac{\begin{array}{c}1.100\\1.001\end{array}}{10.101} = 1\frac{3}{8} \qquad -\frac{1}{2} - \frac{3}{4} \frac{\begin{array}{c}0.100\\0.110\end{array}}{01.010} = -1\frac{1}{4}$$

To change the sign of negative two's complement fractional numbers, all the bits of the number are inverted and a one is added at the least significant bit position.

$$\frac{1}{2} \begin{array}{l}\text{invert all bits}\\ \text{add 1 } LSB\end{array} \frac{\begin{array}{c}1.100\\0.011\\0.001\end{array}}{0.100} = -\frac{1}{2} \qquad -\frac{1}{2} \begin{array}{l}\text{invert all bits}\\ \text{add 1 } LSB\end{array} \frac{\begin{array}{c}0.100\\1.011\\0.001\end{array}}{1.100} = \frac{1}{2}$$

Complementation of +1 produces an erroneous result since there is no representation of −1 in the number system.

$$1 \begin{array}{l}\text{invert all bits}\\ \text{add 1 } LSB\end{array} \frac{\begin{array}{c}1.000\\0.111\\0.001\end{array}}{1.000} = 1$$

As with additive overflow, if the result is increased in size by one bit to n+1-bits (a sign bit with a weight of 2, a unit bit with a weight of −1, and n−1 negatively weighted fractional bits), the complementation of +1.00 produces a result of 01.000 (i.e., −1.00) which is correct. Therefore, any possible errors in complementing a number in the present invention are avoidable by using an extra bit in the result.

Booth/modified Booth multipliers are widely used for two's complement numbers. With suitable modification, they are suitable for negative two's complement numbers. Both Booth and modified Booth multipliers are implemented with sequences of addition, subtraction and shift operations. Since equivalent operations are available for negative two's complement numbers, the resulting multipliers will be similar to conventional two's complement Booth multipliers. The difference for negative two's complement multipliers is that the addition and subtraction conditions are reversed from those of conventional two's complement multipliers. This requires different logic in the control unit. For the Booth multiplier, two bits of the multiplier number (augmented initially with an extra 0 at the least significant end) are inspected on each cycle. The extra 0 is shown in italics in the following examples. Table 2 gives the operations that produce the partial product, P. After the partial product is computed, the multiplier bits are shifted by one bit position (i.e., multiplied by two) and the partial product is shifted down by one bit position (i.e., divided by two). On the last cycle, no shift is performed.

TABLE 2

Booth Multiplier Operations for Negative Two's Complement Numbers

| MULTIPLIER BITS | OPERATION |
| --- | --- |
| 0 0 | P = P |
| 0 1 | P = P − B |
| 1 0 | P = P + B |
| 1 1 | P = P |

Figure 5:
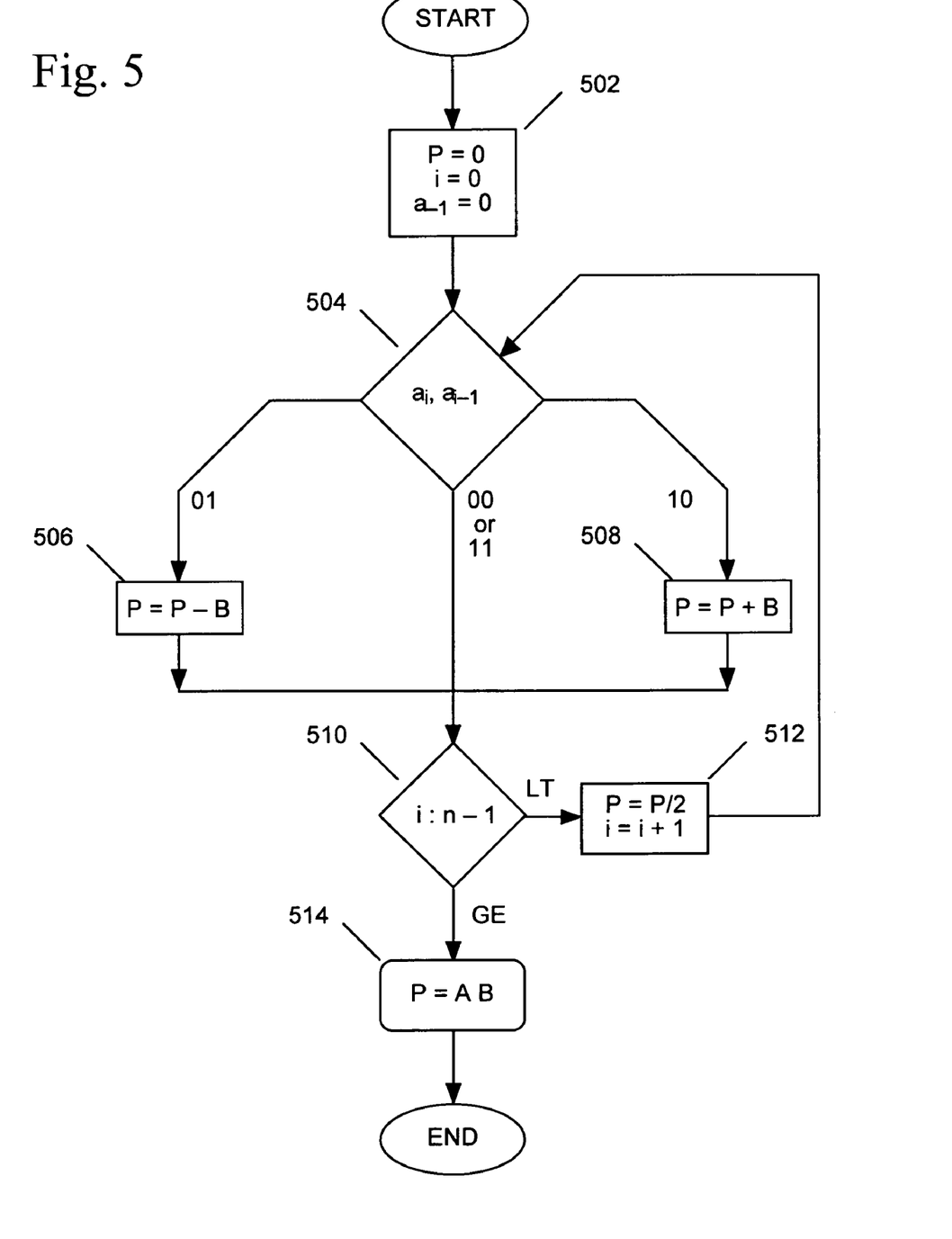
FIG. 5 depicts a flow chart for a radix-2 Booth multiplier for negative two's complement numbers.

A flowchart of a radix-2 Booth multiplier for negative two's complement numbers is depicted in FIG. 5. The process beings at step 502 where the partial product register, P, and the loop counter, i are initialized. In step 504 two bits of the first operand are inspected. Depending on the bit pattern either step 506, 508 or 510 is executed next. If step 506 is executed the second operand is subtracted from the partial product and then step 510 is executed. If step 508 is executed the second operand is added to the partial product and then step 510 is executed. Step 510 tests for completion of the multiplication by determining if the counter i is equal to n−1. If the multiplication is not complete step 512 divides the partial product by 2 and returns to step 504. If it is complete step 514 indicates that the product is complete. This process is illustrated by the following examples:

| | | |
|---|---|---|
| 3/4 • 5/8 | 1.010 | |
| | 1.0110 | |
| 1 0 : Add B | 1.010 | |
| | 1.010 | |
| Shift P | 1.1010 | |
| 1 1: No-Op | 1.1010 | |
| Shift P | 1.11010 | |
| 0 1: Subtract B | 0.110 | |
| | 0.10010 | |
| Shift P | 0.010010 | |
| 1 0: Add B | 1.010 | |
| No Shift | 1.100010 | = 15/32 |
| -3/4 • 5/8 | 0.110 | |
| | 1.0110 | |
| 1 0 : Add B | 0.110 | |
| | 0.110 | |
| Shift P | 0.0110 | |
| 1 1: No-Op | 0.0110 | |
| Shift P | 0.00110 | |
| 0 1: Subtract B | 1.010 | |
| | 1.01110 | |
| Shift P | 1.101110 | |
| 1 0: Add B | 0.110 | |
| No Shift | 0.011110 | = -15/32 |
| 3/4 • -5/8 | 1.010 | |
| | 0.1010 | |
| 1 0 : Add B | 1.010 | |
| | 1.010 | |
| Shift P | 1.1010 | |
| 0 1: Subtract B | 0.110 | |
| | 0.0110 | |
| Shift P | 0.00110 | |
| 1 0: Add B | 1.010 | |
| | 1.01110 | |
| Shift P | 1.101110 | |
| 0 1: Subtract B | 0.110 | |
| No Shift | 0.011110 | = -15/32 |
| -3/4 • -5/8 | 0.110 | |
| | 0.1010 | |
| 1 0 : Add B | 0.110 | |
| | 0.110 | |
| Shift P | 0.0110 | |
| 0 1: Subtract B | 1.010 | |
| | 1.1010 | |
| Shift P | 1.11010 | |
| 1 0: Add B | 0.110 | |
| | 0.10010 | |
| Shift P | 0.010010 | |
| 0 1: Subtract B | 1.010 | |
| No Shift | 1.100010 | = 15/32 |

Modified Booth multipliers are implemented much like Booth multipliers. For radix-4 modified Booth multipliers, three bits of the multiplier number (augmented initially with an extra 0 at the least significant end) are inspected on each cycle. The extra 0 is shown in italics in the following examples. Table 3 gives the operations that produce the partial product, P. The logic in the control unit is required to be modified to realize the operations of Table 3. After the partial product is computed, the multiplier bits are shifted by two bit positions and the partial product is shifted down by two bit positions (i.e., divided by four). On the last cycle, no shift of the partial product is performed.

TABLE 3

Radix-4 Modified Booth Multiplier Operations for Negative Two's Complement Numbers

| MULTIPLIER BITS | OPERATION |
|---|---|
| 0 0 0 | P = P |
| 0 0 1 | P = P − B |
| 0 1 0 | P = P − B |
| 0 1 1 | P = P − 2 B |
| 1 0 0 | P = P + 2 B |
| 1 0 1 | P = P + B |
| 1 1 0 | P = P + B |
| 1 1 1 | P = P |

Figure 6:
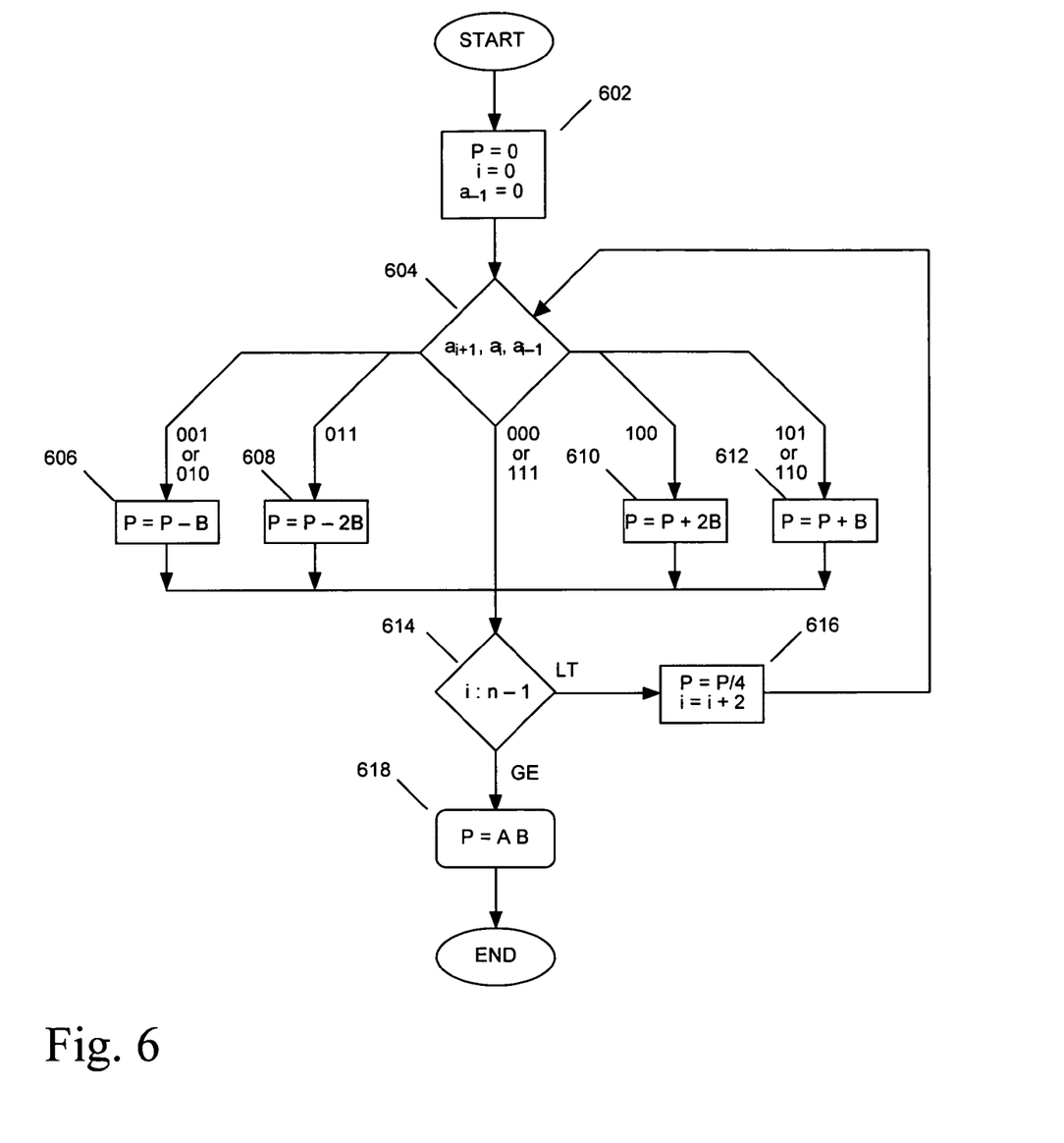
FIG. 6 shows a flow chart for a radix-4 modified Booth multiplier for negative two's complement numbers.

A flowchart of a radix-4 modified Booth multiplier for negative two's complement numbers is depicted in FIG. 6. In step 602 the partial product register, P, and the loop counter, i are initialized. In step 604 three bits of the first operand are inspected. Depending on the pattern either step 606, 608, 610, 612 or 614 is executed next. If step 606 is executed the second operand is subtracted from the partial product and then step 614 is executed. If step 608 is executed two times the second operand is subtracted from the partial product and then step 614 is executed. If step 610 is executed two times the second operand is added to the partial product and then step 614 is executed. If step 610 is executed the second operand is added to the partial product and then step 614 is executed. Step 614 tests for completion. If it is not complete step 616 divides the partial product by 4 and reenters the loop at step 604. If it is complete step 618 indicates that the product is complete. This process is illustrated by the following examples:

| | | |
|---|---|---|
| $\frac{3}{4} \cdot \frac{5}{8}$ | 1.010 | |
| | 1.0110 | |
| 110: Add *B* | 1.010 | |
| | 1.010 | |
| Shift *P* | 1.11010 | |
| 101: Add *B* | 1.010 | |
| No Shift | 1.100010 | $= \frac{15}{32}$ |

Figure 7:
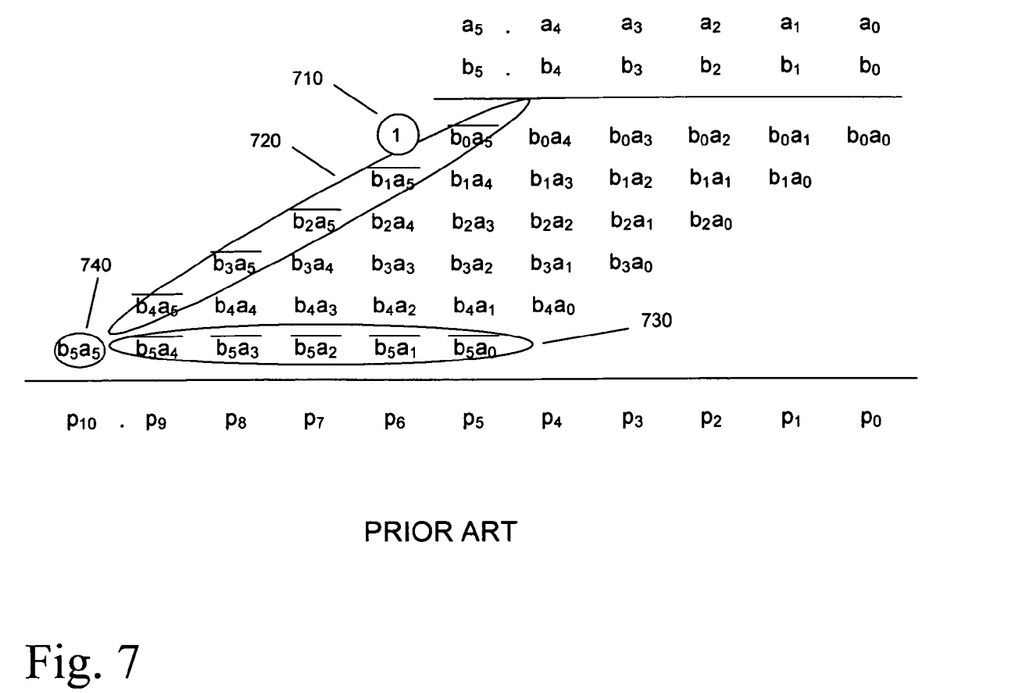
FIG. 7 illustrates the bit product matrix for a two's complement fractional multiplier (prior art).

FIG. 7 depicts the bit products of an example conventional two's complement fractional parallel multiplier. This example is for 6-bit input operands producing an 11-bit two's complement fractional product. The input operands, A and B, are shown at the top of the figure. There are six rows of bit products of the form $b_i a_j$. The product is an 11-bit two's complement fractional number shown at the bottom of the figure. The bit products along the left edge 720 and along the bottom row 730 (except for the bit product at the bottom left corner 740) are shown with an overbar to indicate that they are formed with a NAND gate while the other bit products are formed with an AND gate. There is a 1 at the top of the seventh column from the right 710. The product bits are formed by adding the bits in the columns of the bit product matrix in a manner that is similar to decimal multiplication taught in elementary schools.

Figure 8:
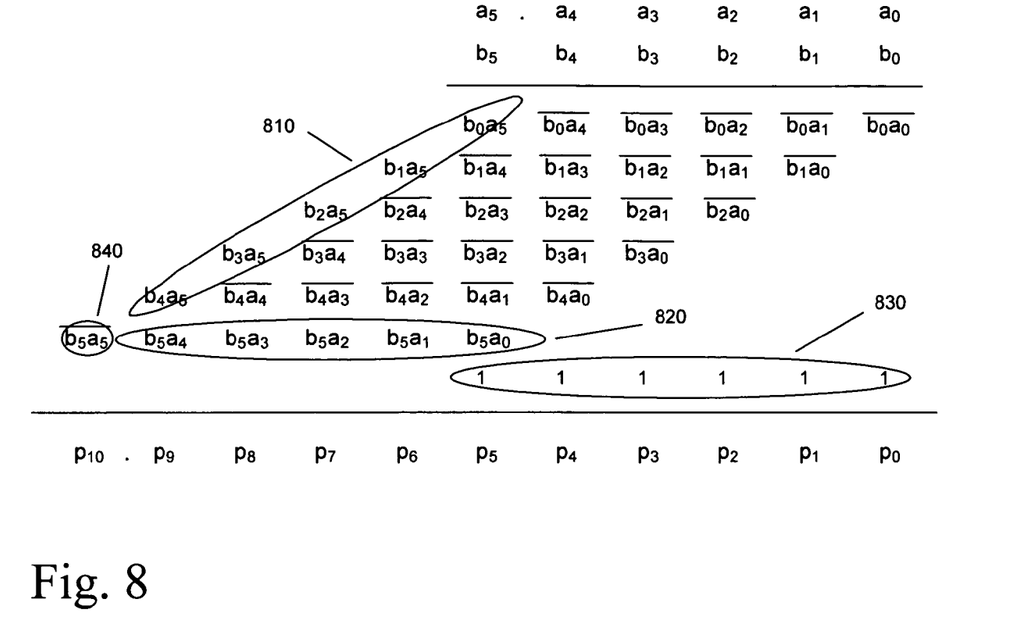
FIG. 8 depicts the bit product matrix for a negative two's complement fractional multiplier.

FIG. 8 depicts the bit products of an example negative two's complement fractional parallel multiplier. Like the prior art shown in FIG. 5, this example is for 6-bit negative two's complement fractional input operands producing an 11-bit negative two's complement fractional product. In contrast to the bit products for the conventional two's complement multiplier, all bit products except for those along the left edge 810 and along the bottom row 820 (except for the bit product at the bottom left corner 840) are shown with an overbar. Also as shown at the bottom 830 there is a 1 added to each of the first six columns from the right. For an n-bit by n-bit multiplier there would be a 1 at each of the n rightmost columns.

Comparison of FIG. 7 and FIG. 8 clearly shows that the hardware implementation of multipliers for negative two's complement fractional numbers is quite different from that n of multipliers for conventional two's complement fractional numbers.

Those skilled in the art will readily appreciate that the present invention that has been described here for fractional numbers applies equally to integers. An n-bit negative two's complement integer, A, has a sign bit, $a_{n-1}$, and n−1 integer bits, $a_{n-2}, a_{n-3}, \ldots, a_0$ Bit $a_0$ has a weight of −1, bit $a_1$ has a weight of −2, ..., bit $a_{n-2}$ has a weight of $-2^{n-2}$, and the sign bit $a_{n-1}$ has a weight of $+2^{n-1}$, The value of an n-bit negative two's complement integer is:

$$A = a_{n-1}2^{n-1} + \sum_{i=0}^{n-2} -a_i 2^i$$

This is similar to the formula for conventional two's complement integers except that the signs of all weights (negative for the sign bit and positive for all other bits for conventional numbers) are reversed.

Those skilled in the art will appreciate that the described invention may be implemented in computer systems, computer program code, or digital signal processors with variations from those described above without departing from the spirit of the claimed invention.

The invention claimed is:

1. A digital signal processor comprising an arithmetic unit that represents numbers in fractional negative two's complement form, where an n-bit number, A, has a sign bit, $a_{n-1}$, and n−1 fractional bits, $a_{n-2}, a_{n-3}, \ldots, a_0$ with a value of $$A = a_{n-1} + \sum_{i=0}^{n-2} -a_i 2^{i-n+1}.$$

wherein the arithmetic unit comprises an extra bit for arithmetic operation results to detect overflow.

2. A computer system comprising an arithmetic unit that represents numbers in fractional negative two's complement form, where a n-bit number, A, has a sign bit, $a_{n-1}$, and n−1 fractional bits, $a_{n-2}, a_{n-3}, \ldots, a_0$ with a value of $$A = a_{n-1} + \sum_{i=0}^{n-2} -a_i 2^{i-n+1}.$$

wherein the arithmetic unit comprises an extra bit for arithmetic operation results to detect overflow.

* * * * *